(12) United States Patent
McElroy

(10) Patent No.: US 6,589,678 B1
(45) Date of Patent: Jul. 8, 2003

(54) FUEL CELL METHOD OF OPERATION

(75) Inventor: James F. McElroy, Suffield, CT (US)

(73) Assignee: Plug Power, Inc., Latham, NY (US)

(*) Notice: Subject to any disclaimer, the term of this patent is extended or adjusted under 35 U.S.C. 154(b) by 415 days.

(21) Appl. No.: 09/672,673

(22) Filed: Sep. 28, 2000

(51) Int. Cl.⁷ .................................. H01M 8/04
(52) U.S. Cl. .......................... 429/13; 429/17
(58) Field of Search ................ 429/13, 17, 12

(56) References Cited

U.S. PATENT DOCUMENTS 5,935,726 A * 8/1999 Chow et al. .................. 429/13

* cited by examiner

*Primary Examiner*—Randy Gulakowski
*Assistant Examiner*—Monique Wills
(74) *Attorney, Agent, or Firm*—Fish & Richardson P.C.

(57) ABSTRACT

Methods of operating a fuel cell and/or a system containing one or more fuel cells are disclosed. The method includes reversing the flow of one or more reactant gases through one or more flow field plates. The direction of flow can be reversed manually or automatically. The methods can prolong the useful life of the fuel cell or fuel cell system.

37 Claims, 4 Drawing Sheets

FUEL CELL METHOD OF OPERATION

BACKGROUND

The invention relates to method of operating a fuel cell and/or systems containing one or more fuel cells.

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water or other low conductivity fluids) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to methods of operating a fuel cell and/or systems containing one or more fuel cells.

The portion of the membrane in a PEM fuel cell where a reactant gas is introduced into the membrane (i.e., the leading edge of the membrane) can begin to dry out if the reactant gas has a dew point below the temperature of the leading edge of the membrane. This can decrease the useful life of the membrane. It can therefore be advantageous for the reactant gas to have a dew point that is about the same as the leading edge of the membrane. This can be accomplished, for example, by hydrating the reactant gas before it enters the fuel cell. But hydrating the gas can result in liquid water collecting in the channels of the flow field plate, a situation commonly referred to as "flooding," which can reduce fuel cell voltage performance.

The invention relates in part to the realization that switching the flow direction of a reactant gas through a flow field plate during a time period when the reactant gas is not flowing through the flow field plate can prolong the useful life of a PEM by reducing drying out of the leading edge of the PEM while also avoiding other potential situations that can reduce fuel cell performance.

One potential advantage is that the methods of the invention can be performed without hydrating the reactant gas so that flooding can be avoided.

Another potential advantage is that the methods of the invention can be performed without increasing the ratio of oxidant gas to fuel gas flowing through the fuel cell. This can avoid operating the fuel cell in electrolysis mode, which can be advantageous because the useful life of a PEM can be reduced as a result of operating the fuel cell in electrolysis mode.

In general, one aspect of the invention relates to a method of operating a fuel cell that includes flowing a reactant gas (e.g., an oxidant gas or a fuel gas) through the fuel cell in one direction so that the fuel cell produces a power output greater than zero. The flow of reactant gas through the fuel cell is then stopped so that the power output of the fuel cell is about zero.

The reactant gas is then flowed through the fuel cell in the opposite direction so that the power output of the fuel cell is greater than zero.

In some embodiments, the reactant gas flows through the fuel cell for a time period of at least about one week (e.g., at least about one month, at least about three months, at least about six months) before the flow of the reactant gas is stopped.

The method can further include, between stopping the flow of the reactant gas and flowing the reactant gas in the opposite direction, performing at least one maintenance step on the fuel cell. After flowing the gas in the reactant gas in the opposite direction, the reactant gas flow can be stopped so that the power output of the fuel cell is zero. After stopping the flow of the reactant gas through the fuel cell in the opposite direction, the reactant gas can flow through the fuel cell in the original direction.

The method can further include: flowing a different reactant gas through the fuel cell in one direction so that the fuel cell produces a power output greater than zero; stopping the flow of the different reactant gas through the fuel cell so that the power output of the fuel cell is about zero; and flowing the different reactant gas through the fuel in the opposite the first direction so that the power output of the fuel cell is greater than zero.

The method can further include: flowing a coolant through the fuel cell in one direction; stopping the flow of the coolant through the fuel cell; and flowing the coolant through the fuel in the opposite direction. The flow of the coolant can be stopped when the flow of the reactant gas is stopped. The flow of the reactant gas in the first and second directions can be concurrent with the flow of the coolant in the first and second directions In general, another aspect of the invention relates to a method of operating a fuel cell stack having two or more fuel cells. The method includes: (a) flowing a reactant gas through the fuel cells in one direction so that the fuel cell stack produces a power output of greater than zero; (b) stopping the flow of a reactant gas through at least one of the fuel cells so that the fuel cell(s) produce a power output of about zero; and (c) flowing the reactant gas through the fuel cells in the opposite direction so that the power output of the fuel cell stack is greater than zero. For the fuel cell(s) in which the reactant gas flow was stopped in step (b), the reactant gas flows through the fuel cell(s) in opposite directions in steps (a) and (c).

At least one maintenance step can be performed on the fuel cell stack between steps (b) and (c). The flow of reactant gas can be stopped after step (c), and then switched to the opposite direction.

During step (b), the reactant gas can flow through one or more of the other fuel cells so that the power output of the fuel cell stack is greater than zero. Alternatively, the flow of reactant gas through all the fuel cells can be stopped during step (b).

The power output of the fuel cell stack during step (b) can be about zero, or it can be greater than zero.

The method can further include: flowing a coolant through the first and second fuel cells in one direction; stopping the flow of the coolant through the first fuel cell; and flowing the coolant through the first and second fuel cells in the opposite direction. The flow of the coolant can be stopped when the flow of the reactant gas is stopped. The flow of the reactant gas in the first and second directions can be concurrent with the flow of the coolant in the first and second directions.

Other features, objects, and advantages of the invention will be apparent from the description and drawings, and from the claims.

DETAILED DESCRIPTION

The invention relates to methods of operating a fuel cell and/or a fuel cell system containing one or more fuel cells.

Figure 1:
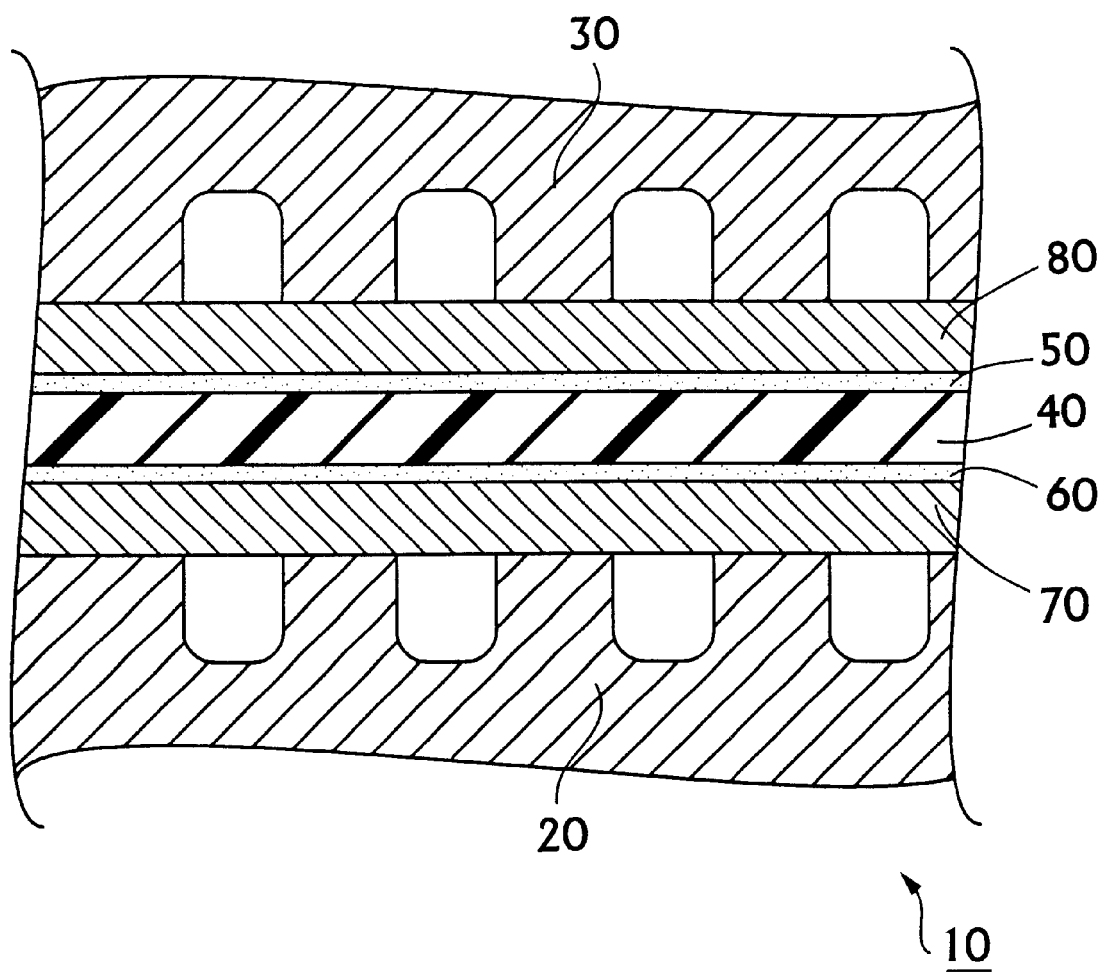
FIG. 1 is a cross-sectional view of an embodiment of a fuel cell.

FIG. 1 shows an embodiment of a PEM fuel cell 10 including flow field plates 20 and 30, a PEM 40, catalysts 50 and 60 and gas diffusion layers 70 and 80.

Figure 2:
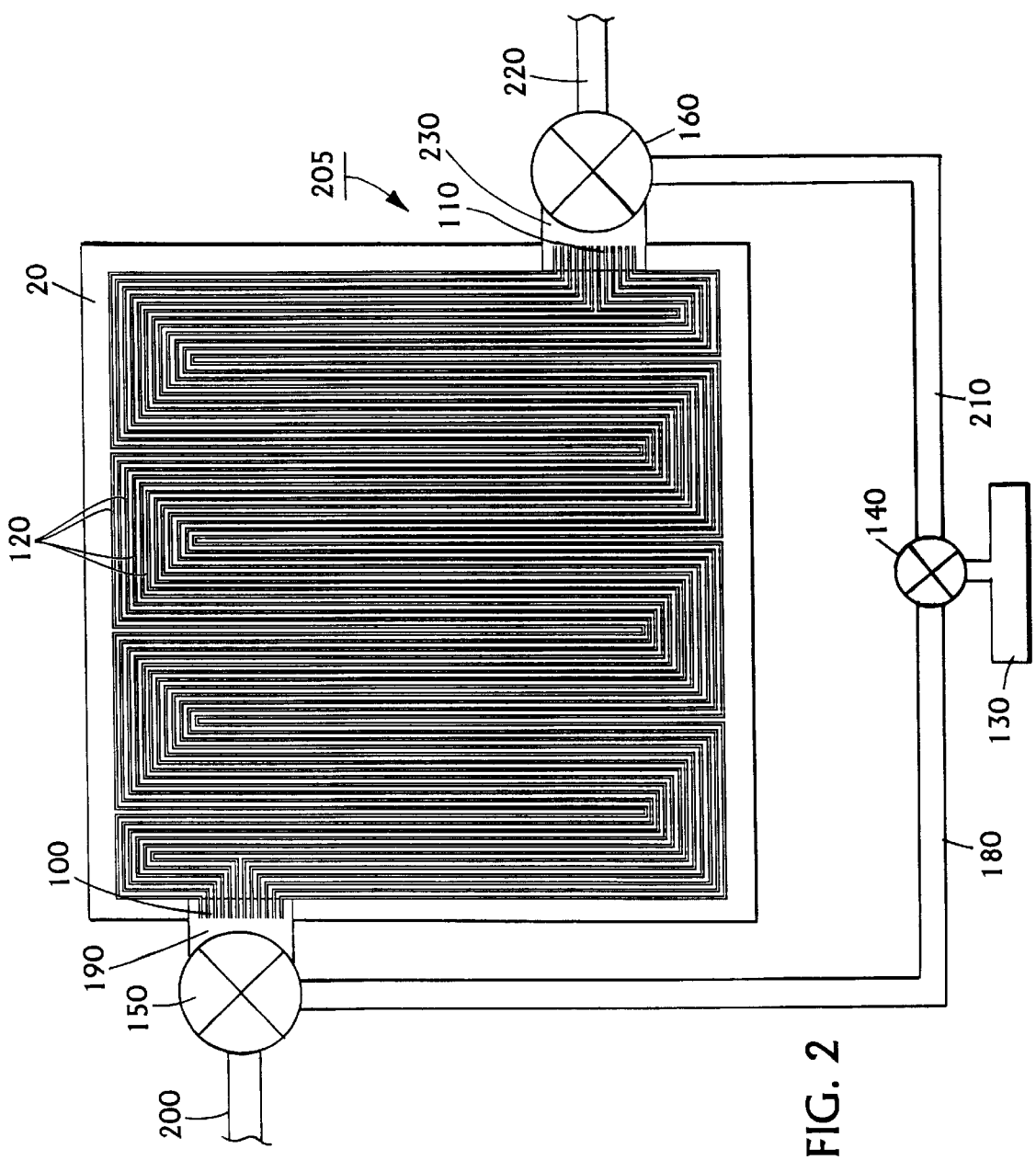
FIG. 2 is a block diagram of an embodiment of a system including a fuel cell.

FIG. 2 shows a system 205 including flow field plate 20 of fuel cell 10. Flow field plate 20 has regions 100 and 110, and open faced channels 120 that define a flow path for reactant gas (e.g., oxidant gas, such as air or oxygen, or fuel gas, such as hydrogen or hydrocarbon) between regions 100 and 110. Flow field plate 20 is fluidly connected to a reactant gas source 130, devices (e.g., valves) 140, 150 and 160, and tubes 170, 180, 190, 200, 210, 220 and 230. Each of devices 140, 150 and 160 has at least two positions which allow a gas to flow through system 205 along different paths so that system 205 has at least two operational states.

In one operational state, devices 140, 150 and 160 are positioned so that the reactant gas flows from source 130 to region 100 along tubes 170, 180 and 190. The gas flows from region 100 to region 110 via channels 120. The gas exits flow field plate 20 at region 110 along tubes 220 and 230. In this operational state, gas does not flow from between tubes 190 and 200. Gas also does not flow between tubes 210 and 170, between tubes 210 and 220, or between tubes 210 and 230.

In a different operational state, devices 140, 150 and 160 are positioned so that the reactant gas flows from source 130 to region 110 along tubes 170, 210 and 230. The gas flows from region 110 to region 100 via channels 120. The gas exits flow field plate 20 at region 100 along tubes 190 and 200. In this operational state, gas does not flow from between tubes 220 and 230. Gas also does not flow between tubes 180 and 170, between tubes 180 and 190, or between tubes 180 and 200.

Switching the operational state of system 205 has the effect of reversing the flow of the reactant gas through flow field plate 20. The operational state can be switched during any period of time that is convenient. Generally, the operational state is switched while reactant gas is not flowing through flow field plate 20. For example, reactant gas can flow through flow field plate 20 (e.g., so that the fuel cell produces a non-zero power output) for a desired period of time (e.g., at least about one week, at least about one month, at least about two months, at least about three months, or at least about six months). The flow of reactant gas is then stopped (e.g., so that the fuel cell produces a power output of about zero), and the operational state of system 205 is changed. The desired period of time can be based, for example, on a planned maintenance interval and/or on one or more performance characteristics of the fuel cell, which can be measured manually and/or automatically. In general, the operational state of system 205 can be switched manually and/or automatically.

Figure 3:
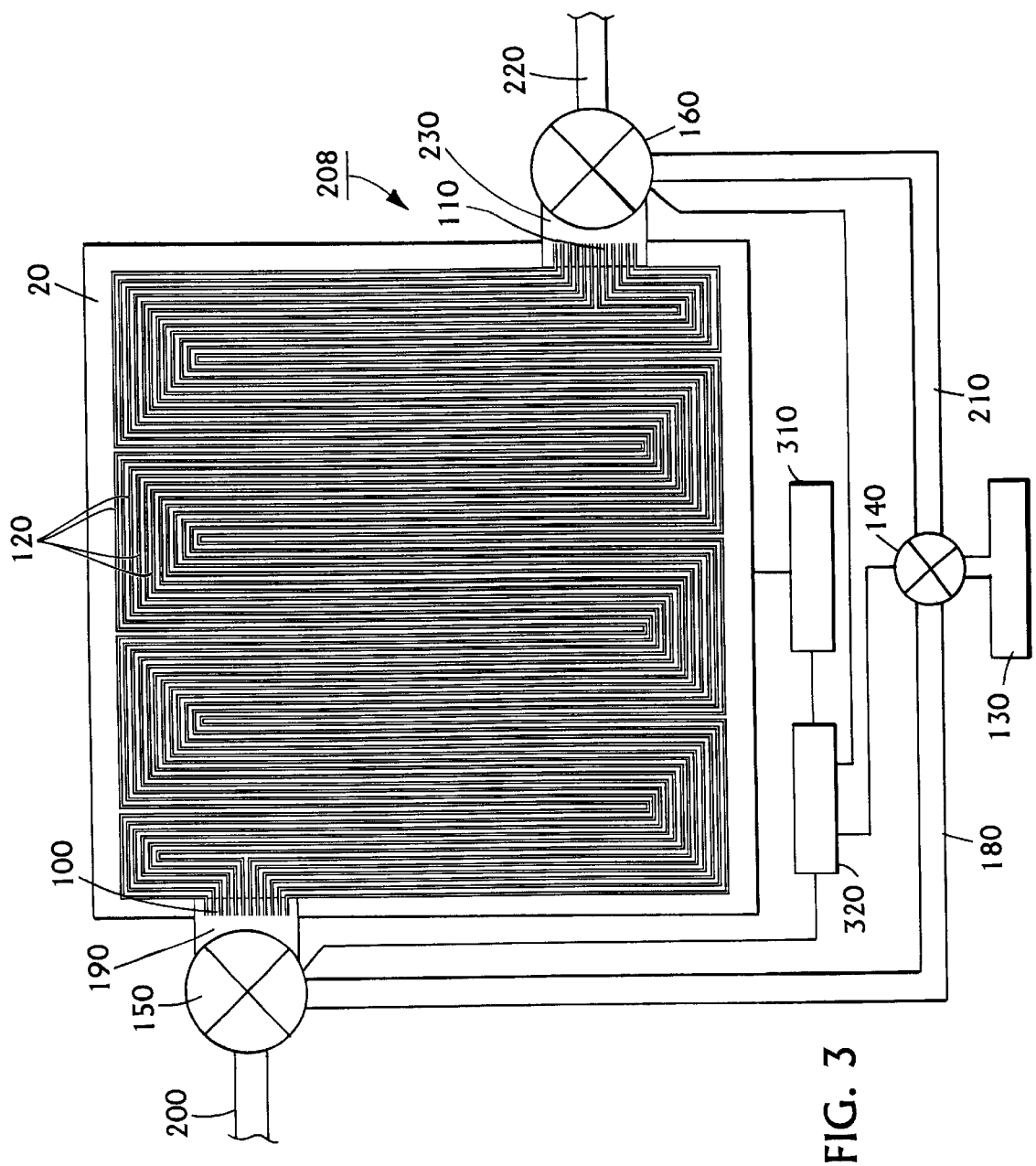
FIG. 3 is a block diagram of an embodiment of a system including a fuel cell.

FIG. 3 shows a system 208 designed so that its operational states can be automatically switched. System 208 includes a monitor 310 that measures one or more performance characteristics of system 208. Such performance characteristics are known to those skilled in the art and include, for example, power output, chemical make up of output gas (e.g., fluorine content of the gas), amount of the time that the fuel cell has been operating in a sub-saturated reactant gas state, and/or reactant gas flow rate. When the measured parameter(s) fall below some predetermined value, monitor 310 sends a signal to a controller 320. Controller 320 changes the positions of devices 140, 150 and 160. This changes the operational state of fuel cell 10 by reversing the flow of gas through flow field plate 20. Typically, controller 320 stops the flow of gas through flow field plate (e.g., by closing device 140) so that the power output of fuel cell 10 drops to zero. Then, controller 320 switches the positions of devices 140, 150 and 160 to reverse gas flow through flow field plate 20.

System 208 can also be designed so that the operational state of system 208 is manually changed. For example, monitor 310 can be designed to provide a read-out that can be read by a maintenance technician. Depending upon the read-out of monitor 310, the technician can manually change the positions of devices 140, 150 and 160 to change the operational state of system 208. In some embodiments, system 208 is designed so that the operational state of system 208 can be changed both manually and automatically.

In other embodiments, the operational state of systems 205 and 208 can be reversed as follows. Devices 140, 150 and 160 are positioned so that gas does not flow through the system (e.g., devices 140, 150 and 160 are closed). Tubes 190 and 230 are disconnected from devices 150 and 160, respectively. Flow field plate 20 is then rotated (e.g., rotated 180°), and tubes 190 and 230 are connected to devices 160 and 150, respectively. Typically, rotating flow field plate 20 involves rotating fuel cell 10. In certain embodiments, however, flow field plate 20 can be rotated without rotating other components of fuel cell 10.

Figure 4:
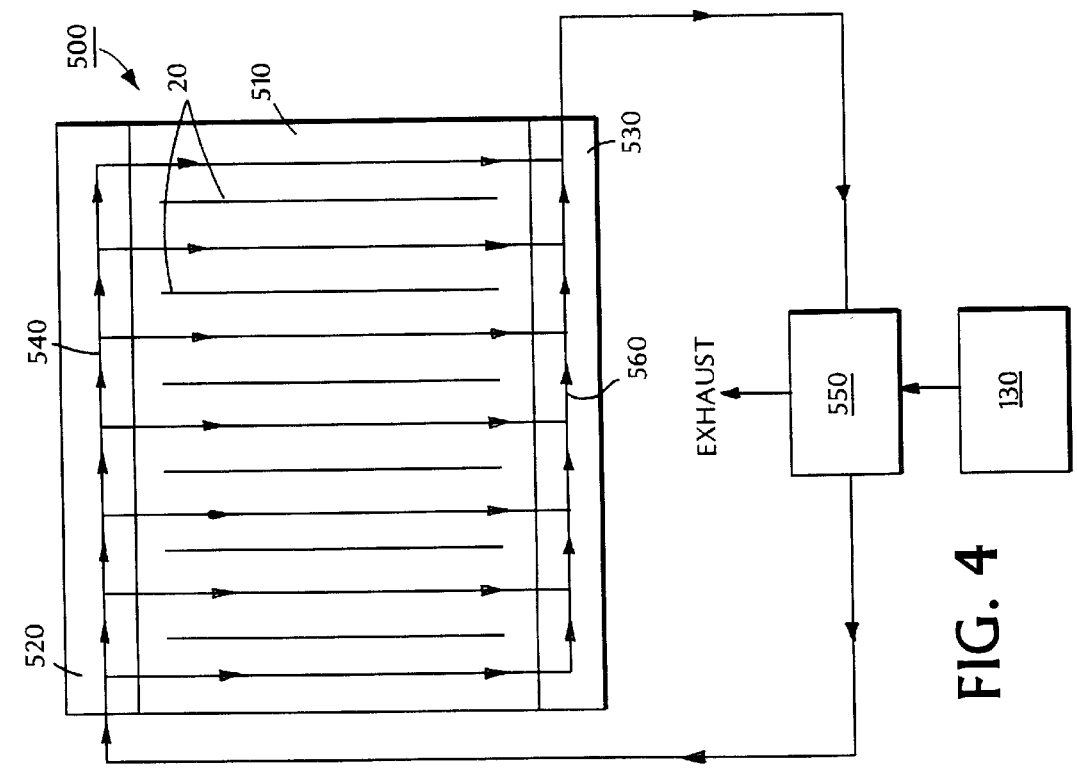
FIG. 4 is a block diagram of an embodiment of a system including more than one fuel cell.

FIG. 4 shows a system 500 that includes a fuel cell stack 510 having multiple fuel cells, each with a flow field plate 20. Gas flow through system 500 is controlled by a device 550 (e.g., a valve), which has more than one position so that fuel cell stack has at least two operational states.

In one operational state, device 550 is positioned so that gas flows from source 130 through fuel cell stack 510 as follows. Gas enters fuel cell stack 510 at a region 520, flows along a manifold 540, through flow field plates 20, along a manifold 530 and out at a region 560, as indicated by the arrows. In another operational state, device 550 is positioned so that the gas flow is reversed. The operational state of fuel cell stack 510 can be manually and/or automatically controlled.

Figure 5:
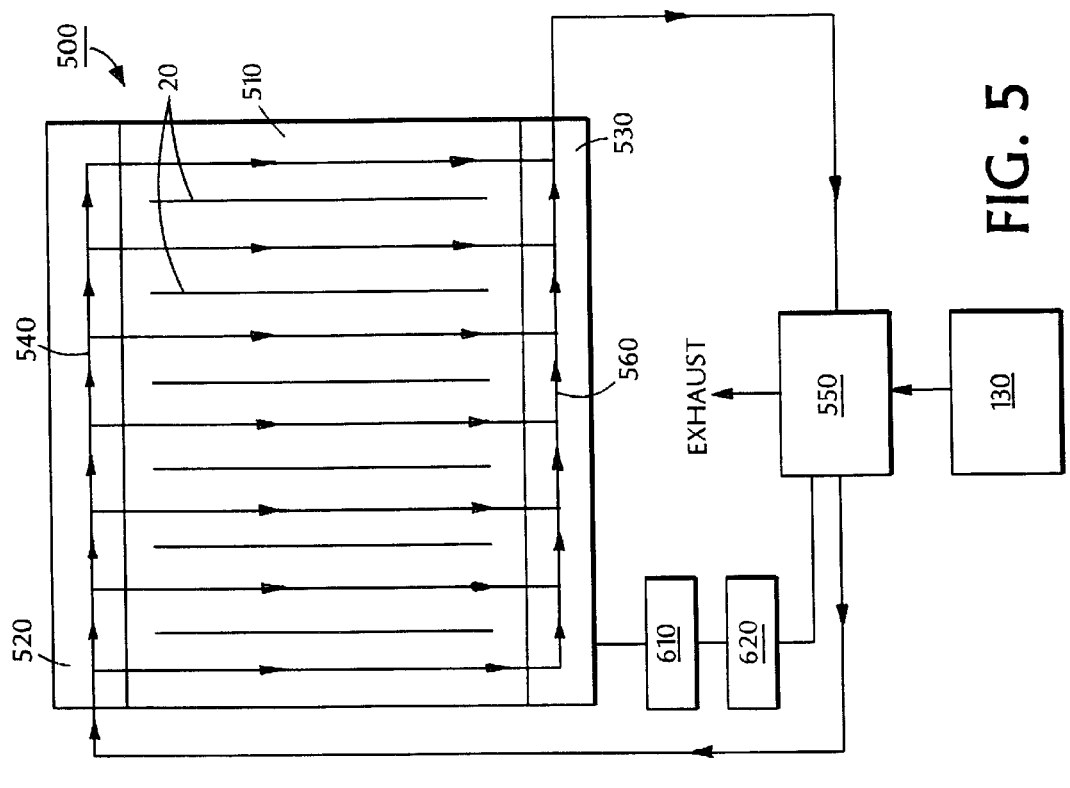
FIG. 5 is a block diagram of an embodiment of a system including more than one fuel cell.

FIG. 5 shows a system 505 designed so that the operational state of fuel cell 510 can be automatically controlled. System 505 includes a monitor 610 that measures one or more performance characteristics of fuel cell stack 510 and sends a corresponding signal to controller 210. When the measured parameter(s) fall below some predetermined value, monitor 610 sends a signal to a controller 620 that causes controller 620 to change the position of device 550, thereby changing the operational state of fuel cell stack 510. Typically, controller 620 stops the flow of gas through fuel cell stack 510 (e.g., by closing device 550) so that the power output of fuel cell stack 510 drops to zero. Then, controller 610 switches the positions of device 550 to reverse gas flow through flow field plates 20.

System 505 can also be designed so that the operational state of system 505 is manually changed. For example, monitor 610 can be designed to provide a read-out that can be read by a maintenance technician. Depending upon the read-out of monitor 610, the technician can manually change the positions of device 550 to change the operational state of fuel cell stack 510. In some embodiments, system 510 is designed so that the operational state of system 510 can be changed both manually and automatically.

Within fuel cell stack 510, gas flow a given flow field plate 20 can be controlled as discussed above with regard to FIGS. 1–3.

While the foregoing discussion has focused on the design and flow of gas through flow field plate 20, those skilled in the art will appreciate that gas flow through flow field plate 30 can be similarly designed and controlled. In certain embodiments, the design and flow of gas through flow field plates 20 and 30 can both be designed and controlled as discussed above. In these embodiments, reversal of gas flow through flow field plates 20 and 30 can occur at the same time or at different times. Moreover, the channels in flow field plates 20 and 30 can be arranged so that the flow of oxidant and fuel gas can be cross-flow or concurrent flow.

In addition, the coolant flow channels can be arranged so that the flow of coolant is concurrent with or counter to the flow of one or more of the reactant gases. Typically, the flow of coolant is concurrent with the flow of the reactant gases. In some embodiments, the flow of coolant is stopped and reversed during the period of time that the flow of reactant gas(es) is stopped and reversed. Thus, the flow of reactant gas(es) can be reversed without switching the direction of coolant flow relative to the flow direction of the reactant gas(es).

Furthermore, those skilled in the art will appreciate that devices, such as one or more batteries, can be connected to the fuel cell or fuel cell stack so that, during the time period that the power output of the fuel cell or fuel cell stack is about zero (e.g., when reactant gas flow is stopped), power output from the battery can be used.

While certain embodiments of the invention, as well as their principals of operation, have been disclosed herein, the invention is not limited to these embodiments or principals of operation. For example, fuel cells other than PEM fuel cells can be used. Other embodiments are within the claims.

What is claimed is:

1. A method of operating a fuel cell, comprising:
   flowing a reactant gas through the fuel cell in a first direction so that the fuel cell produces a power output greater than zero;
   stopping the flow of the reactant gas through the fuel cell in the first direction so that the power output of the fuel cell is about zero; and
   flowing the reactant gas through the fuel cell in a second direction opposite the first direction so that the power output of the fuel cell is greater than zero.

2. The method of claim 1, wherein the reactant gas is an oxidant gas.

3. The method of claim 1, wherein the reactant gas is a fuel gas.

4. The method of claim 1, further comprising, after stopping the flow of the reactant gas in the first direction and before flowing the reactant gas in the second direction, performing at least one maintenance step on the fuel cell.

5. The method of claim 1, further comprising, after flowing the reactant gas in the second direction, stopping the flow of the reactant gas in the second direction so that the power output of the fuel cell is zero.

6. The method of claim 5, further comprising, after stopping the flow of the reactant gas through the fuel cell in the second direction, flowing the reactant gas through the fuel cell in the first direction.

7. The method of claim 1, further comprising:
   flowing a different reactant gas through the fuel cell in one direction so that the fuel cell produces a power output greater than zero;
   stopping the flow of the different reactant gas through the fuel cell so that the power output of the fuel cell is about zero; and
   flowing the different reactant gas through the fuel cell in the direction opposite the first direction so that the power output of the fuel cell is greater than zero.

8. The method of claim 7, wherein the reactant gas is an oxidant gas.

9. The method of claim 8, wherein the different reactant gas is a fuel gas.

10. The method of claim 1, wherein the reactant gas flows through the fuel cell for a time period of at least about one week before the flow of the reactant gas is stopped.

11. The method of claim 10, wherein the time period is at least about one month.

12. The method of claim 10, wherein the time period is at least about three months.

13. The method of claim 10, wherein the time period is at least about six months.

14. The method of claim 1, further comprising:
   flowing a coolant through the fuel cell in a first direction;
   stopping the flow of the coolant through the fuel cell in the first direction; and
   flowing the coolant through the fuel in a second direction opposite the first direction.

15. The method of claim 14, wherein the flow of the coolant is stopped when the flow of the reactant gas is stopped.

16. The method of claim 14, wherein the flow of the reactant gas in the first and second directions is concurrent with the flow of the coolant in the first and second directions.

17. A method of operating a fuel cell stack including at least first and second fuel cells, the method comprising:
   flowing a reactant gas through the first and second fuel cells in a first direction so that the fuel cell stack produces a power output of greater than zero;
   stopping the flow of the reactant gas through the first fuel cell so that the first fuel cell produces a power output of about zero;
   flowing the reactant gas through the first and second fuel cells in a second direction opposite the first direction so that the power output of the fuel cell stack is greater than zero.

18. The method of claim 17, wherein the reactant gas is an oxidant gas.

19. The method of claim 17, wherein the reactant gas is a fuel gas.

20. The method of claim 17, further comprising, between steps (b) and (c), performing at least one maintenance step on the fuel cell stack.

21. The method of claim 17, further comprising:
   (d) after step (c), stopping the flow of the reactant gas through the first fuel cell in the second direction so that the power output of the first fuel cell is zero.

22. The method of claim 21, further comprising: after step (d), flowing the reactant gas through the first fuel cell in the first direction.

23. The method of claim 17, further comprising, during step (b), flowing the reactant gas through the second fuel cell so that the power output of the fuel cell stack is greater than zero.

24. The method of claim 17, further comprising, during step (b), stopping the reactant gas through the second fuel cell so that the power output of the second fuel cell is about zero.

25. The method of claim 17, wherein, during step (b), the power output of the fuel cell stack is about zero.

26. The method of claim 17, wherein, during step (b), the power output of the fuel cell stack is greater than zero.

27. The method of claim 17, wherein the reactant gas flows through the second fuel cell in one direction in step (a) and in the opposite direction in step (c),
   wherein the composition is disposed within an interior of the reformer.

28. The method of claim 17, further comprising:
   flowing a different reactant gas through the first fuel cell in one direction so that the first fuel cell produces a power output greater than zero;
   stopping the flow of the different reactant gas through the first fuel cell so that the power output of the first fuel cell is about zero; and flowing the different reactant gas through the first fuel in the opposite direction so that the power output of the fuel cell is greater than zero.

29. The method of claim 28, wherein the reactant gas is an oxidant gas.

30. The method of claim 29, wherein the different reactant gas is a fuel gas.

31. The method of claim 17, wherein the reactant gas flows through the first fuel cell for a time period of at least about one week before the flow of the reactant gas is stopped.

32. The method of claim 31, wherein the time period is at least about one month.

33. The method of claim 32, wherein the time period is at least about three months.

34. The method of claim 32, wherein the time period is at least about six months.

35. The method of claim 17, further comprising:
flowing a coolant through the first and second fuel cells;
stopping the flow of the coolant through the first fuel cell; and
flowing the coolant through the first and second fuel cells.

36. The method of claim 35, wherein the flow of the coolant is stopped when the flow of the reactant gas is stopped.

37. The method of claim 35, wherein the flow of the reactant gas in the first and second directions is concurrent with the flow of the coolant in the first and second directions.

* * * * *